United States Patent
Brown et al.

(10) Patent No.: US 11,258,665 B2
(45) Date of Patent: Feb. 22, 2022

(54) SYSTEM AND METHOD FOR AUTOMATED MANAGEMENT ACCESS POINT NETWORK CONNECTION

(71) Applicant: DELL PRODUCTS, LP, Round Rock, TX (US)

(72) Inventors: Michael E. Brown, Austin, TX (US); Deepa Hegde, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 16/712,127

(22) Filed: Dec. 12, 2019

(65) Prior Publication Data

US 2021/0184929 A1 Jun. 17, 2021

(51) Int. Cl.

| H04L 12/24 | (2006.01) |
|---|---|
| H04L 29/12 | (2006.01) |
| H04L 12/46 | (2006.01) |
| H04L 29/08 | (2006.01) |
| H04L 41/08 | (2022.01) |
| H04L 61/4511 | (2022.01) |
| H04L 67/02 | (2022.01) |
| H04L 41/0893 | (2022.01) |
| H04L 67/563 | (2022.01) |
| H04L 61/5007 | (2022.01) |

(52) U.S. Cl.
CPC ...... *H04L 41/0886* (2013.01); *H04L 12/4641* (2013.01); *H04L 41/0893* (2013.01); *H04L 61/1511* (2013.01); *H04L 61/2007* (2013.01); *H04L 67/02* (2013.01); *H04L 67/2814* (2013.01)

(58) Field of Classification Search
CPC ............ H04L 12/4641; H04L 41/0253; H04L 41/0886; H04L 41/0893; H04L 61/1511; H04L 61/2007; H04L 67/02; H04L 67/2814
See application file for complete search history.

(56) References Cited

U.S. PATENT DOCUMENTS

| 9,772,866 | B1 * | 9/2017 | Aron ................... G06F 9/45558 |
| 9,929,901 | B2 | 3/2018 | Ahmed et al. |
| 10,298,460 | B2 | 5/2019 | Ahmed et al. |
| 10,623,395 | B2 * | 4/2020 | Saha ....................... G06F 21/85 |
| 2012/0198349 | A1 * | 8/2012 | Chandrasekhar ....... H04L 67/10 715/740 |
| 2012/0246553 | A1 * | 9/2012 | Ong .................... G06F 16/9535 715/234 |
| 2013/0111024 | A1 * | 5/2013 | Setia ...................... H04L 67/02 709/225 |

(Continued)

*Primary Examiner* — Aaron N Strange
(74) *Attorney, Agent, or Firm* — Larson Newman, LLP

(57) ABSTRACT

An information handling system includes a network interface device and a service processor coupled to an internal network interface. The service processor receives a network connection request from a mobile device connected to the network interface device via the internal network interface, and in response to receiving the network connection request assigns an internet protocol address to the mobile device. The service processor redirects an outbound hypertext transfer protocol request from the mobile device, intercepts the outbound hypertext transfer protocol request from the mobile device, and serves a management application interface page associated with the service processor.

20 Claims, 4 Drawing Sheets

(56) References Cited

U.S. PATENT DOCUMENTS

| | | | |
|---|---|---|---|
| 2014/0043633 A1* | 2/2014 | Hagiuda | G06F 3/1204 |
| | | | 358/1.13 |
| 2014/0366117 A1* | 12/2014 | Kumar | H04L 63/02 |
| | | | 726/11 |
| 2016/0014660 A1* | 1/2016 | Bar | H04W 12/00 |
| | | | 455/439 |
| 2016/0344736 A1* | 11/2016 | Khait | H04L 63/0815 |
| 2017/0064023 A1* | 3/2017 | Huang | H04L 67/306 |
| 2017/0149733 A1* | 5/2017 | Chastain | H04L 61/2521 |
| 2017/0250952 A1* | 8/2017 | Westberg | H04L 67/1002 |
| 2017/0366393 A1* | 12/2017 | Shaker | H04L 67/02 |
| 2018/0041527 A1* | 2/2018 | Call | G06F 11/3409 |
| 2018/0191708 A1 | 7/2018 | Saha | |
| 2018/0242154 A1 | 8/2018 | Ballard et al. | |
| 2019/0068554 A1* | 2/2019 | Austin | H04L 63/101 |
| 2019/0087639 A1* | 3/2019 | Crane | G06K 9/00442 |
| 2019/0158372 A1* | 5/2019 | Shanbhag | H04W 76/10 |
| 2020/0351261 A1* | 11/2020 | Milton | H04L 63/20 |
| 2020/0358770 A1* | 11/2020 | Parla | H04L 63/168 |
| 2020/0358869 A1* | 11/2020 | Liu | H04L 67/141 |
| 2020/0396604 A1* | 12/2020 | Olshansky | H04W 12/069 |
| 2021/0119898 A1* | 4/2021 | Lauer | H04L 63/101 |
| 2021/0184929 A1* | 6/2021 | Brown | H04L 41/0886 |

\* cited by examiner

SYSTEM AND METHOD FOR AUTOMATED MANAGEMENT ACCESS POINT NETWORK CONNECTION

FIELD OF THE DISCLOSURE

The present disclosure generally relates to information handling systems, and more particularly relates to automated management access point network connection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a service processor that receives a network connection request from a mobile device connected to a network interface device via an internal network interface. In response to receiving the network connection request, the service processor may assign an internet protocol address to the mobile device, redirect an outbound hypertext transfer protocol request from the mobile device, intercept the outbound hypertext transfer protocol request from the mobile device, and serve a management application interface page associated with the service processor.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
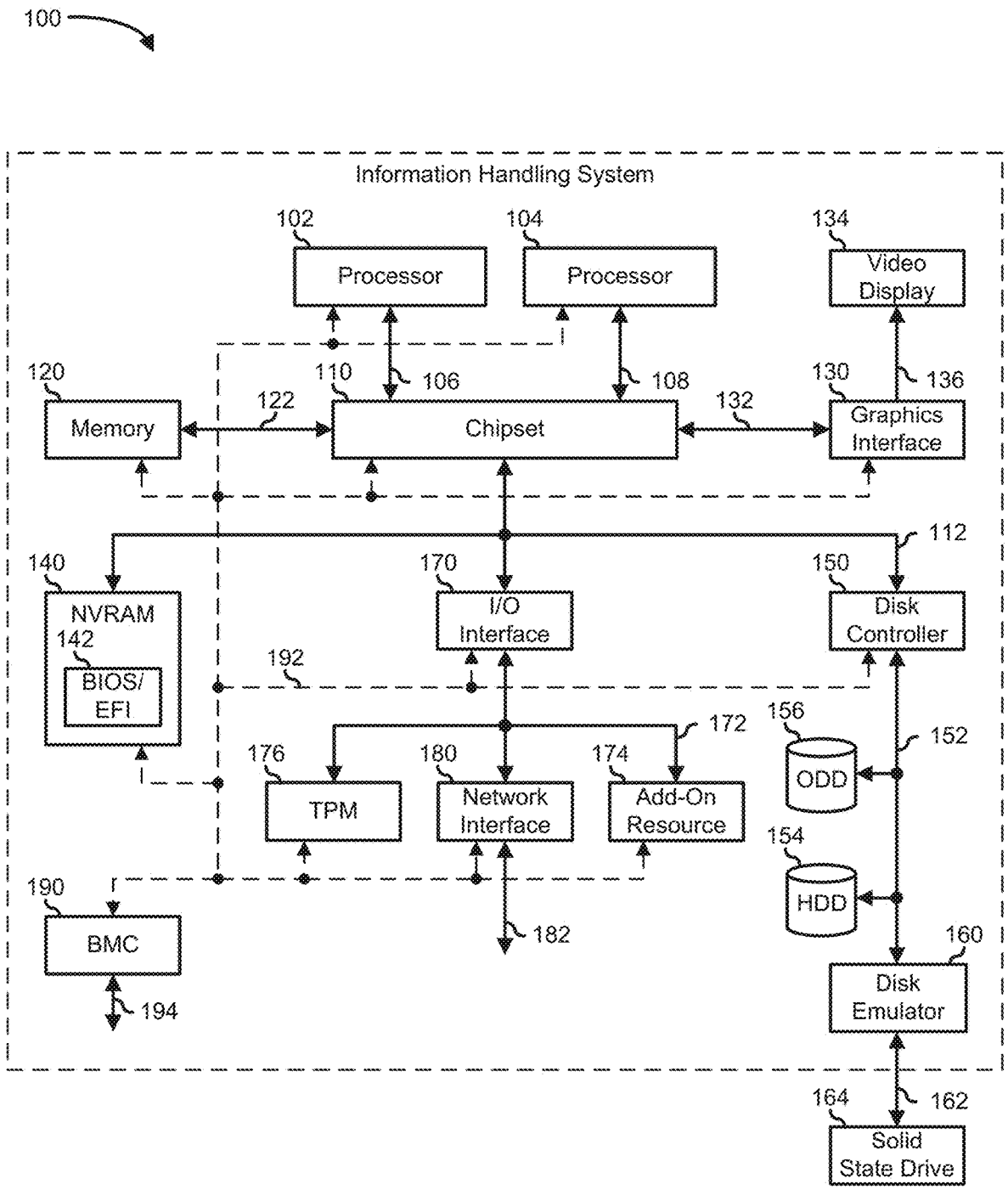
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface, a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a USB or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated into another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Figure 2:
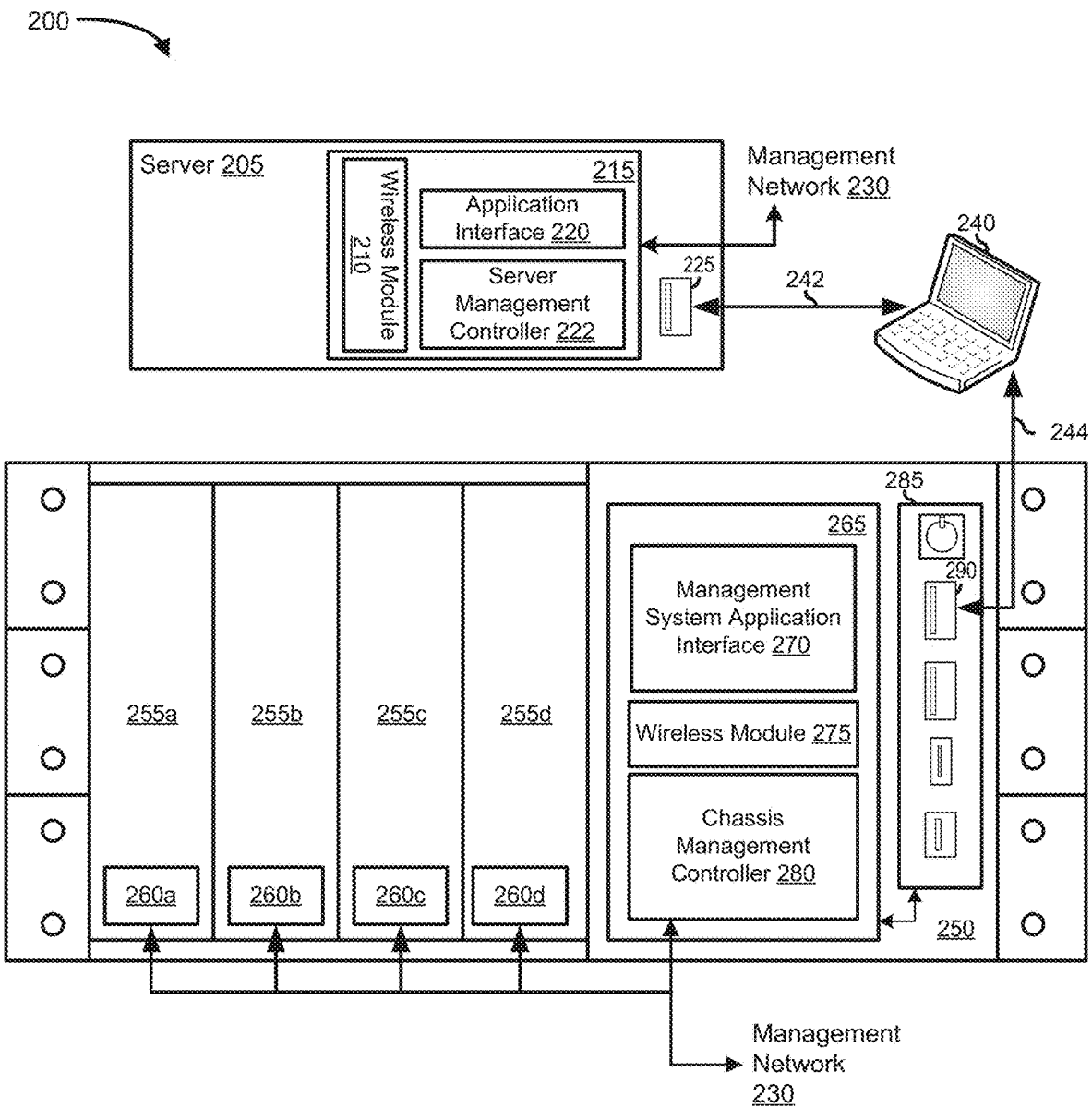
FIG. 2 is a block diagram illustrating an example of a system for automated management access point network connection, according to an embodiment of the present disclosure.

FIG. 2 shows a system 200 for automated management access point network connection including a blade chassis 250, a server 205, and a mobile device 240. Blade chassis 250 is configured to include a number of modular processing resources, or blades, that are provided in a common frame (i.e., the chassis). As such, blade chassis 250 includes server blades 255a-255d each of which is similar to information handling system 100. Blade chassis 250 includes a control panel 285 and a chassis management system 265 with a chassis management controller 280, a management system application interface 270, and a wireless management module 275. Server 205 is another processing system similar to information handling system 100 that is configured as an individual processing resource. Server 205 a server management system 215 with a wireless management module 210, a server management application interface 220 and a server management controller 222. Similarly, each one of server blades 255a-255d includes a server management system such as server management systems 260a-260d which may each be configured similar to server management system 215.

Blade chassis 250 may be a modular platform such as Dell PowerEdge MX7000 or similar that hosts blocks of servers and storage resources and provides shared power, cooling, networking I/O, and system management. Similar to the iDRAC "USB Direct" that allows an administrator to connect directly to the iDRAC USB port, the MX7000 chassis includes a USB connection for the "Chassis Direct" feature, which allows an administrator to connect a laptop to the chassis with a USB cable, and then using the USB connection as a network connection, connect to the management web user interface (UI) over the USB connection. One problem that is commonly encountered with the USB Direct feature is that there is no obvious, user-friendly way for the administrator to know how to access the web UI after making the USB connection unless they have read the documentation.

Chassis management systems 265, server management systems 260a-260d, and server management system 215 are connected to management network 230 to provide for out-of-band monitoring, management, and control of blade chassis 250, server blades 255a-255b, and server 205. For example, chassis management system 265, server management systems 260a-260d, and server management system 215 can provide system monitoring functions, such as temperature monitoring, power supply monitoring, physical intrusion monitoring, hot-swap and hot-plug monitoring, other monitoring functions that can be performed outside of their hosted environments or other system monitoring functions as needed or desired. Chassis management system 265, server management systems 260a-260d, and server management system 215 can also provide system management and control functions such as cooling fan speed control, power supply management, hot-swap and hot-plug management, firmware management and update management for system BIOS or UEFI, Option ROM, device firmware, and the like, or other system management and control functions as needed or desired.

Chassis management controller 280 and server management controller 222 represent embedded controllers or management modules are associated with blade chassis 250 and server 205 respectively. Chassis management controller 280 and server management controller 222 operates separately from blade chassis 250 and server 205 and can include a BMC, an iDRAC, a service processor, or another type of management controller as needed or desired. Further, chassis management controller 280 and server management controller 222 can operate in accordance with the IPMI specification, the WSMan standard, or another interface standard for embedded management systems, as needed or desired. The skilled artisan will recognize that chassis management controller 280 and server management controller 222 can include other circuit elements, devices, or subsystems, such as an embedded controller, a logic device such as a Programmable Array Logic (PAL) device, a Complex Programmable Logic Device (CPLD), a Field-Programmable Gate Array (FPGA) device, or the like, multiplexors, and other devices as needed or desired to provide the functions and features as described herein.

Wireless management modules 275 and 210 operate to provide wireless connectivity between users with a wireless-enabled mobile device 240 and management network 230 through the respective chassis management controller 280 and server management controller 222. For example, wireless management modules 275 and 210 can include Wi-Fi wireless interfaces in accordance with one or more IEEE 802.11 specifications for high-speed data communication between mobile device 240 and the wireless management modules, at speeds of up to 30 megabits per second or more. Wireless management modules 275 and 210 can also include Bluetooth wireless interfaces in accordance with one or more Bluetooth specifications, including BLE, also known as Bluetooth Smart (BTS), for lower-speed communications at speeds of up to 150 kilo-bits per second or more.

Wireless management modules 275 and 210 include various security features to ensure that the connection between mobile device 240 and management network 230 is secure and that the user of mobile device 240 is authorized to access the resources of the management network. In particular, wireless management modules 275 and 210 operate to provide various Wi-Fi user and device authentication schemes, such as schemes that are in accordance with one or more IEEE 802.11 specifications, Service Set Identification (SSID) hiding, Media Access Control Identification (MAC ID) filtering to allow only pre-approved devices or to disallow predetermined blacklisted devices, static IP addressing, Wired Equivalent Privacy (WEP) encryption, Wi-Fi Protected Access (WPA) or WPA2 encryption, Temporary Key Integrity Protocol (TKIP) key mixing, Extensible Authentication Protocol (EAP) authentication services, EAP variants such as Lightweight-EAP (LEAP), Protected-EAP (PEAP), and other standard or vendor-specific user and device authentication schemes, as needed or desired. Further, wireless management modules 275 and 210 operate to provide various Bluetooth device and service authentication schemes, such as a Security Mode 2 service level-enforced security mode that may be initiated after link establishment but before logical channel establishment, a Security Mode 3 link level-enforced security mode that may be initiated before a physical link is fully established, a Security Mode 4 service level-enforced security mode that may be initiated after link establishment but before logical channel establishment and that uses a Secure Simple Pairing (SSP) protocol, or other device or service authentication schemes, as needed or desired.

Management system application interface 270 and server management application interface 220 are applications installed on a physical host operating system of the managed device. For example, management system application interface 270 such as Dell EMC OpenManage Enterprise Module (OME-Modular) application that runs on chassis management system 265 is used to access chassis management controller 280 and management systems of server blades in the chassis such as server management systems 260a-260d. Server management application interface 220 runs on server management system 215 and is used to access server management controller 222. Similarly, a server management application interface is installed on each of server blades 255a-255d to access each one of server management systems 260a-260d respectively. Management system application interface 270 and server management application interface 220 are user interfaces such as a web interface, a RACADM command-line interface, Redfish, and WSMan, etc. to provide remote management capabilities to information handling systems such as server 205 and blade chassis such as blade chassis 250.

Control panel 285 includes one or more USB ports such as USB port 290. The ports may include a USB-A port, a micro-module AB port that supports USB on-the-go (OTG) port, etc. A connection can be made between a USB device plugged into USB port 290 and chassis management controller 280 via chassis management system 265 through an internal network interface. A connection can also be made between a USB device plugged into a USB port 225 and server management controller 222 via server management system 215 through an internal network interface. This way, a device such as mobile device 240 can access the management functions and features of the chassis processor and/or information handling system that is managed by chassis management controller 280 and/or server management controller 222 via management system application interface 270 and server management application interface 220.

Further, mobile device 240 can also access management network 230. For example, a technician in a data center can connect a laptop device to USB port 290 or USB port 225 and provide a firmware update for wireless management module 275 or wireless management module 210 respectively. A connection can be made between a mobile device 240 that has established a wireless connection to wireless management module 275 or wireless management module 210 can access the management functions and features of the information handling system that is managed by chassis management system 265 and server management system 215 respectively. This way, mobile device 240 can access management network 230, and the management network can be used to access the management functions and features of the wireless management module or to provide a firmware update for the wireless management module via management system application interface 270 or server management application interface 220 respectively, for example.

Mobile device 240 represents a wired and/or wireless communication-enabled devices, such as a tablet device, a laptop computer, a cellular telephone, and the like, that is configured to interact with chassis management system 265, server management systems 260a-260d and server management system 215 via a wired connection or a wireless connection to wireless management module 275 and wireless management module 210 accordingly. In particular, mobile device 240 can include a mobile operating system (OS), such as an Android OS, an iOS, a Windows® mobile OS, or another mobile OS that is configured to operate with the hardware of the mobile device. As such, the hardware of mobile device 240 can include Android-enabled hardware, iOS-enabled hardware, Windows-enabled hardware, or other hardware, as needed or desired.

Chassis management system 265 and server management system 215 may host a dynamic host configuration protocol (DHCP) service that provides a unique IP address to connected mobile device 240. In addition, chassis management system 265 and server management system 215 can establish the connection with mobile device 240 based upon a static IP address of the mobile device or provide a sub-network using a combination of DHCP-provided IP address and static IP address as needed or desired. In a particular embodiment, the DHCP service operates in accordance with the DHCPv4 or DHCPv6 specification, in a stateless auto-configuration mode, or another IP protocol. In a particular embodiment, chassis management system 265 and server management system 215 operates to provide a network configuration that may provide and/or allow mobile device 240 to access chassis management system 265 and/or server management system 215. As such, server management system 215 can provide SSIDs, security keys, gateway addresses, and other configuration information.

Chassis management system 265 and server management system 215 operate as a Layer-2 switch that redirects packets on the sub-network to the targeted endpoints. As such, mobile device 240 can have access to server management system 215 including server management application interface 220 via USB cable 242 connected to USB port 225. Similarly, mobile device 240 can have access to chassis management system 265 including management system application interface 270 via USB cable 244 connected to USB port 290. USB cable 242 and USB cable 244 may be standard type A/A USB cables while USB port 225 and USB port 290 are standard micro-AB USB ports used as management ports that allow direct access to the system's management controllers. In this way, a mobile device plugged into management ports can access the management functions and features of the chassis or information handling system that is managed by the management controller and can access the management network. In addition, mobile device 240 can have access to server management system 215 including server management application interface 220 via wireless management module 210. Similarly, mobile device 240 can have access to chassis management system 265 including management system application interface 270 via wireless management module 275. In addition, mobile device 240 can have access to management network 230 which is a virtual local area network that is accessible only for "at the box" users like Wi-Fi, users connected to USB port 225, or chassis direct users, that is users connected to the USB port 290.

The current disclosure utilizes a captive portal feature for automated management network connection. As used herein the captive portal is a management application interface webpage that is displayed to newly connected mobile devices of a management network. In a particular embodiment, when a user connects one end of USB cable 244 to USB port at blade chassis 250 while the other end of USB cable 244 is attached to mobile device 240, management system application interface 270 automatically launches a web browser pointed to a specific page as determined by the portal also referred herein as a chassis direct portal. In a method, the aforementioned is accomplished with a series of steps such as the DHCP service automatically assigning a specific IP address to one of the connected mobile devices that include mobile device 240. The DHCP settings are also configured to set the mobile device 240 domain name service (DNS) address to the chassis management controller 280 that also hosts a DNS forwarder such as a DNSMASQ service or similar. The DNS forwarder or DNSMASQ service resolves any and all DNS requests to the IP address of chassis management controller 280 that intercepts all outbound hypertext transfer protocol (HTTP) requests from mobile device 240.

If mobile device 240 supports the "active internet probing" feature, then when the operating system of mobile device 240 detects a network connection, such as connecting to a USB port or the wireless interface associated with the blade chassis or server, the operating system sends out HTTP requests as part of bringing up the network connection. The operating system detects that mobile device 240 is running behind a network with a captive portal and automatically launch a web browser pointing at a particular page of management system application interface 270 associated with chassis management controller 280. In one example, the particular page may be a chassis phonebook service page. If mobile device 240 does not support the active internet probing features, then any web server requests by the user are redirected to the particular page of management system application interface 270 associated with chassis management controller 280. In both of the aforementioned cases, the user does not need to remember a domain name or IP address to bring up a page of the management application interface of the management controller.

Although FIG. 1 and FIG. 2 show specific elements, these elements such as blade chassis 250 and server 205 and its sub-elements such as chassis management system 265 and server management system 215, are exemplary, and more or fewer elements can be considered to be included as needed or desired, and that other types of elements can be included as needed or desired.

Figure 3:
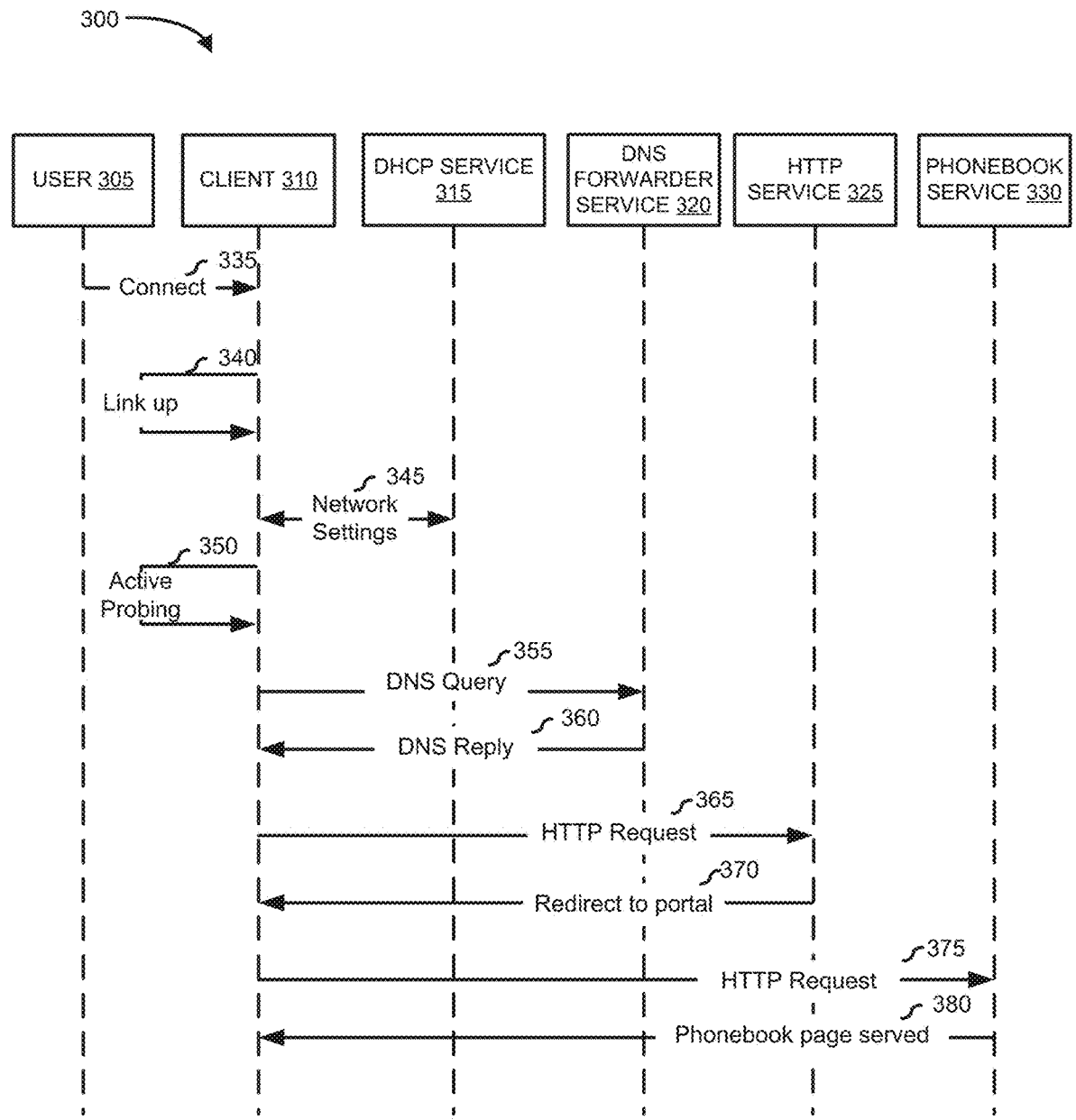
FIG. 3 is a sequence diagram illustrating an example of automated management access point network connection, according to an embodiment of the present disclosure.

FIG. 3 is a sequence diagram 300 illustrating operations for automated management access point network connection, according to at least one embodiment. Prior to the current disclosure, typically after making a connection, the administrator had to disable Wi-Fi on the mobile device and then pull up a web browser and type in a static internet protocol address to access the management module user interface. The internet protocol address may be an IPv4 or an IPv6 address which has a size of 128 bits such as: 2002:0db5:86a3:0000:0000:8a3e:0360:7834. Without reading the documentation prior to making the connection, there is no indication for the administrator on how to use or gain access to the management module user interface.

Here, the current disclosure manages the configurations and/or connections to automatically connect to the management application user interface when the administrator connects to a network interface such via a USB port, a Wi-Fi, etc. The sequence of operations can be performed in different embodiments, having any of a variety of architectures including, but not limited to one illustrated at FIG. 2. In some embodiments, the sequence of operations may include more, fewer, or different operations than those illustrated in FIG. 3, and those operations may be performed in an order different than that illustrated in FIG. 3.

FIG. 3 includes a user 305, a client 310, a DHCP service 315, a DNS forwarder service 320, an HTTP service 325, and a phonebook service 330. At step 335, user 305 connects to client 310 which may be a mobile device, a laptop, or the like. For example, user 305 may plug a USB cable between client 310 and a USB port at a blade chassis or an information handling system. The USB port may be one of the USB ports in control panel on the front of the chassis. At step 340, a network link comes up on the USB Ethernet adaptor on the client 310 and an embedded controller also referred to as a management controller in the chassis. This means that the network connection state is good between the network interface in the mobile device and the network interface in the chassis or information handling system. For example, a light-emitting diode under the USB port at the control panel turns green and a USB Ethernet adapter is displayed on the client device.

At step 345, network settings may be automatically configured via DHCP service 315 and/or a router advertisement daemon (RADVD). The dynamic host configuration for IPv4 is mainly applied with a DHCPv4 server. However, for IPv6 addresses, the dynamic host configuration may be applied using the RADVD or with a DHCPv6 server. The embedded controller which acts as a DHCP server and hosts DHCP and/or RADVD service automatically assigns transmission control protocol/internet protocol (TCP/IP) information to client 310 and returns the network configuration, including the IPv4/IPv6 address, gateway, and DNS server. In particular, the USB Ethernet adaptor on the mobile devices gets an IPv4 and/or an IPv6 address from the embedded controller. In an embodiment, the DNS server address in client 310 may be updated to point to the embedded controller which hosts a DNS forwarder service 320 such as a DNSMASQ or similar. Subsequent to the network configuration, client 310 is now plugged into the internal virtual local area network (VLAN) of the chassis. In particular, client 310 is plugged into the management VLAN also referred to as management network which is VLAN 4005 of the chassis unless a different VLAN is specified during an initial configuration of the chassis.

At step 350, if active probing is enabled in the client, then the operating system sends network requests as part of bringing up the network connection that typically defaults to the operating system support website. For example, Windows operating system probes some of the Microsoft® servers to check if the internet is reachable or not. In the process, the Windows operating system checks the IPv4 and IPv6 address of dns.msftncsi.com which is the Microsoft network connectivity status indicator (NCSI) site.

At step 355, client 310 makes a DNS query also referred to as a DNS request for the domain name of the operating system support website. Otherwise, if active probing is not enabled, client 310 makes a DNS query when the user brings up a web browser. At step 360, because DNS forwarder service 320 is listening on the internal VLAN of the chassis, in particular, the VLAN 4005 bridge interface, DNS forwarder service 320 receives the DNS query. DNS forwarder service 320 transmits a DNS reply to the DNS query with the IP address of the VLAN 4005 bridge interface. At step 365, client 310 transmits an HTTP GET request to HTTP service 325 using the IP address in the DNS reply. In particular, the HTTP_HOST or SERVER_NAME variable in the header of the HTTP GET request is updated to the domain name of the operating system support website and the destination IP address set to the IP address received in the DNS reply. Phonebook service 330 is configured to provide access to available devices in the chassis. Phonebook service 330 is managed via virtual hosting running on an HTTP server. The HTTP server may be an Apache HTTP server that is listening on port 80 and port 443 of the internal VLAN bridge interface.

At step 370, the HTTP service receives the HTTP GET request and parses the header to determine the value set in the HTTP_HOST variable. If the value of the HTTP_HOST variable is not equal to the domain name of the management application user interface, the URL of the HTTP GET request is rewritten with the URL of the management application user interface, for example, "https://ome-m.local," which is the address of the chassis phonebook service. Further, the status code of the HTTP response may be set to 301 which effectively sends a URL redirection to the client.

At step 375, client 310 transmits the HTTP GET request using the updated URL to the phonebook service 330. At step 375, phonebook service 330 sends an HTTP response of a phonebook page through which the management application graphical user interface of the management controller can be accessed. The phonebook service page includes a list of entries to the available devices such as the modular information handling system on the chassis.

Figure 4:
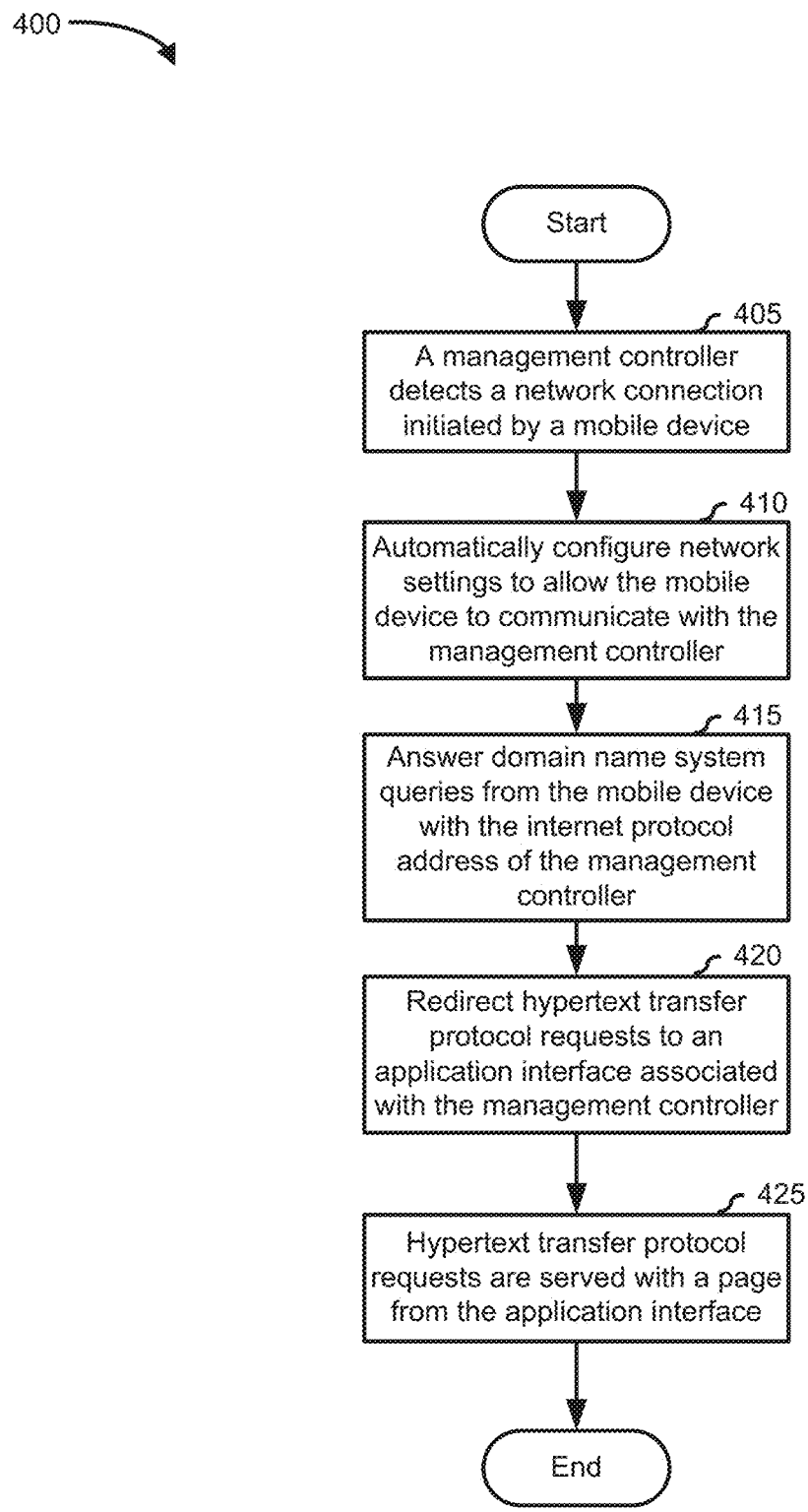
FIG. 4 is a flowchart illustrating an example of a method for automated management access point network connection, according to an embodiment of the present disclosure.

FIG. 4 illustrates a method 400 for automated management access point network connection. The method 400 may be performed by one or more components of FIG. 2. The method 400 typically starts at block 405 where an embedded controller detects a network connection initiated by an information handling system such as a mobile device or a laptop. The network connection may be a wired or a wireless network connection. The wired connection may be through a USB cable connected to a USB port in a chassis on one end and the mobile device on the other end. When the USB cable is connected from the mobile device to the chassis or information handling system, a new network Ethernet adaptor/interface will appear on both the mobile device and EC. For example, on the mobile device with a Windows operating system, a remote network driver interface specification (NDIS) compatible device shows up in the network properties. A similar network Ethernet adaptor/interface appears inside the EC.

The method proceeds to block 410 where the method automatically configures network settings to allow the mobile device to communicate with the management controller. In particular the management controller may assign an internet protocol address to the mobile device and other configuration information such as a subnet mask and default gateway. In addition, the method may update TCP/IP settings in the mobile device to use a particular DNS server and/or a gateway.

The method proceeds to block 415 where the method, the management controller in particular, answers DNS queries from the mobile device with the IP address of the management controller. The method proceeds to block 420 where the method, the management controller in particular, redirects HTTP GET requests from the mobile device to an application interface associated with the management controller. In particular, the management controller responds to the HTTP GET request with an HTTP 301 "Moved Permanently" redirect status response code to indicate that the requested resource has moved the to the updated URL. The method proceeds to block 425 wherein the method, the management controller, in particular, serves HTTP GET requests with a page from a management application interface associated with the management controller.

In particular, if the management controller is a component of the blade chassis such as the Dell MX7000 or similar, the management controller may serve a page from a chassis phonebook service that may be hosted by a web server such as an Apache web server for any and all of the HTTP GET requests. This can be achieved by a setting in a virtual host configuration in the web server wherein the Apache webserver is used as a reverse proxy. The page may contain a list of entries or URLs to available devices such as modular information handling systems in the blade chassis and/or the server management systems. Otherwise, the management controller may serve a page from a management application interface hosted by the information handling system for any and all of the HTTP GET requests.

Although FIG. 3, and FIG. 4 show example blocks of sequence diagram 300 and method 400 in some implementation, sequence diagram 300 and method 400 may include additional blocks, fewer blocks, different blocks, or differently arranged blocks than those depicted in FIG. 3 and FIG. 4. Additionally, or alternatively, two or more of the blocks of sequence diagram 300 and method 400 may be performed in parallel. For example, step 350 and step 355 of sequence diagram 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   detecting, by a management controller, a network connection from a mobile device with direct access to a management network associated with the management controller;
   when the network connection at the management network is detected, then automatically performing network configuration settings including assigning an internet protocol address to the mobile device to allow the mobile device to communicate with the management controller;
   determining whether the mobile device supports an active probing feature;
   in response to determining that the mobile device does not support the active probing feature, resolving a domain name service request from the mobile device to a particular internet protocol address of the management controller;
   intercepting an outbound hypertext transfer protocol request from the mobile device; and
   redirecting the outbound hypertext transfer protocol request to an application interface page associated with the management controller.

2. The method of claim 1, further comprising updating a domain name service address in the mobile device with the particular internet protocol address of the management controller.

3. The method of claim 1, wherein the redirecting the outbound hypertext transfer protocol request includes rewriting a uniform resource locator of the outbound hypertext transfer protocol request with a hostname of the application interface page.

4. The method of claim 1, further comprising hosting a domain name system forwarder.

5. The method of claim 1, wherein the application interface page is a phonebook service page that contains a list of entries to available devices in a chassis.

6. The method of claim 5, wherein the available devices include a modular information handling system.

7. The method of claim 1, further comprising listening at a virtual local area network bridge interface for the domain name service request.

8. The method of claim 7, further comprising responding to the domain name service request from the mobile device with a domain name service response that includes a specific internet protocol address of a virtual local area network bridge.

9. A blade chassis, comprising:
   a plurality of slots for blade servers;
   a management network communicatively coupled to the blade chassis; and a management controller communicatively coupled to the management network, wherein when the management controller detects that a network connection is initiated by a mobile device via a network interface with direct access to the management network, then the management controller is configured to:
configure network settings including assigning an internet protocol address to the mobile device to allow the mobile device to communicate to the management controller;
determine whether the mobile device supports an active probing feature;
in response to a determination that the mobile device does not support the active probing feature, resolve a domain name service request from the mobile device to the management controller;
intercept an outbound hypertext transfer protocol request from the mobile device; and
redirect the outbound hypertext transfer protocol request to a management interface page associated with the management controller.

10. The blade chassis of claim 9, wherein the management controller hosts a domain name system forwarder.

11. The blade chassis of claim 9, wherein the network connection is initiated when a user connects one end of a universal serial bus cable to a universal serial bus port, and wherein another end of the universal serial bus cable is attached to the mobile device.

12. The blade chassis of claim 9, wherein the management controller is further configured to rewrite a uniform resource locator of the outbound hypertext transfer protocol request with a hostname of the management interface page.

13. The blade chassis of claim 9, wherein the management controller is further configured to listen at a virtual local area network bridge interface for the domain name service request.

14. The blade chassis of claim 9, wherein the management interface page associated with the management controller contains a list of entries of available devices associated with the blade chassis, wherein the list of entries of available devices include modular servers.

15. An information handling system comprising:
a host processor including a network interface device, wherein the network interface device is coupled to an internal network interface with direct access to a management network associated with a management controller; and
a service processor coupled to the internal network interface, wherein the service processor is configured to receive a network connection request from a mobile device connected to the network interface device via the internal network interface, in response to receiving the network connection request, to assign an internet protocol address to the mobile device, determine whether the mobile device supports an active probing feature, in response to a determination that the mobile device does not support the active probing feature, to resolve a domain name service request form the mobile device to a particular internet address of the management controller, to redirect an outbound hypertext transfer protocol request from the mobile device, to intercept the outbound hypertext transfer protocol request from the mobile device, and to serve a management application interface page associated with the service processor.

16. The information handling system of claim 15, wherein the service processor is further configured to configure network settings to allow the mobile device to communicate with the service processor.

17. The information handling system of claim 15, wherein the service processor is further configured to host a domain name service forwarder.

18. The information handling system of claim 15, wherein the service processor is further configured to rewrite a uniform resource locator of the outbound hypertext transfer protocol request with a hostname of the management application interface page.

19. The information handling system of claim 15, wherein the service processor comprises a baseboard management controller.

20. The information handling system of claim 15, wherein the service processor is further configured to provide a domain name service response to a domain name service request, wherein the domain name service response includes redirect information to redirect the outbound hypertext transfer protocol request to the service processor.

* * * * *